2,806,782
Patented Sept. 17, 1957

2,806,782
METHOD OF PRODUCING STABILIZED AUSTENITIC CAST-STEEL

Guy Faber, Wettingen, Switzerland, assignor to Aktiengesellschaft Brown, Boveri & Cie., Baden, Switzerland, a joint-stock company No Drawing. Application February 23, 1956, Serial No. 567,061

Claims priority, application Switzerland March 4, 1955

3 Claims. (Cl. 75—51)

Austenitic cast-steel was hitherto mainly used because of its good resistance to corrosion and scaling without any great requirements concerning its mechanical properties.

It has been recognized that especially stabilized austenitic cast-steel shows unusually low ductility and strength factors. The poor properties are due to thin carbide plates which arise in the residual hardening and cause premature cracks or breaks due to their brittleness.

A principal object of the invention is to eliminate the formation of these carbide plates and to produce a stabilized austenitic cast-steel having good mechanical properties. The invention is characterized in that the formation of carbide plates in the structure is entirely or partly prevented by removal of the carbon, dissolved in the fusion, in a manner not involving oxidation. According hereto, the carbon is removed in the form of mixed crystals of nitrides and carbides—thus of carbonitrides—of an added metal forming carbides and nitrides which then are present in solid form in or on the fluid bath. The carbonitrides, formed in this way, exert only a slight influence on the steel strength since they crystallize in cubes, and the formation of the dangerous plate-shaped carbides is almost or entirely prevented. Titanium and zirconium are suitable as additive metals.

The removal of the carbon in the form of solid carbonitrides in the fluid fusion advantageously is effected by simultaneous addition of nitrogen and one of the above mentioned metals.

The carbonitrides formed can partly be removed prior to the casting, since they rise to the top of the bath during the cooling period of the fused metal.

The formation of the disturbing carbide plates during the residual hardening is eliminated by the reduction of the carbon dissolved in the melting bath. The carbonitrides, remaining in the pool, reduce—due to their advantageous shape (cubes)—the strength factors significantly less than do laminar deposits.

The invention will now be described with greater particularity with reference to the following illustrative but non-limitative specific example:

Example

A melt of austenitic chromium-nickel-steel, produced in known manner, and containing 0.1% by weight of carbon, was treated with titanium, in form of a ferroalloy containing about 30% of titanium, in an amount corresponding to 0.8% by weight of the melt. The added titanium must be in such a quantity as is required to form carbonitrides of the composition 2 Ti-C-N. Immediately after this addition had melted, nitrogen was added in form of high nitrogen containing ferro-chromium in an amount corresponding to 0.1% N by weight of the melt. The amount of added nitrogen must correspond with the amount of carbon in the melt. The melt was now allowed to stand for about 15 minutes and the carbonitrides and nitrides rising to the surface were skimmed off. After cooling the casting was found to contain only few plate-like carbide crystals.

This steel had the following mechanical properties:

| Yield Point, kg./mm.$^2$ | Ultimate Strength, kg./mm.$^2$ | Elongation, percent | Reduction, percent | Impact Value (keyhole test bar), m.kg./cm.$^2$ |
|---|---|---|---|---|
| 19.1 | 51.6 | 32.6 | 36 | 9.8–10.3 |

Another melt of same analysis but without addition of nitrogen showed upon examination many plate-like carbide crystals and had the following mechanical properties:

| Yield Point, kg./mm.$^2$ | Ultimate Strength, kg./mm.$^2$ | Elongation, percent | Reduction, percent | Impact Value (keyhole test bar), m.kg./cm.$^2$ |
|---|---|---|---|---|
| 19.2 | 38.2 | 14.4 | 14.0 | 2.1–4.1 |

In a repetition of the foregoing example, it was found that simultaneous treatment of the melt with nitrogen and particulate zirconium in an amount about twice that given above for titanium resulted in substantial elimination of plate-like carbide crystals and in similar enhancement of the mechanical properties of the austenitic cast-steel.

I claim:

1. Method of producing stabilized austenitic cast-steel from an austenitic steel melt containing carbon, characterized in that the formation of carbide plates in the structure is entirely or partly prevented by the step of simultaneously adding to the melt nitrogen and a metal selected from the group consisting of titanium and zirconium in amounts stoichiometrically equivalent to the carbon, to form a carbonitride of the added metal which solidifies at a higher temperature than does the residual melt.

2. Method according to claim 1, characterized in that the added metal is titanium.

3. Method according to claim 2, characterized in that the carbon in the melt is segregated by addition to said fusion of nitrogen and a metal selected from the group consisting of titanium and zirconium in an amount, with respect to the carbon content of the melt, sufficient to form a carbonitride of the composition 2 Me-C-N, where Me=the added metal, and in that after the formation of the carbonitride, the melt is allowed to stand for a period in order that the specifically lighter carbonitride ascend to the surface where it can be removed, and skimming carbonitride particles from the surface of the melt.

References Cited in the file of this patent

UNITED STATES PATENTS

| | | |
|---|---|---|
| 1,922,037 | Hardy | Aug. 15, 1933 |
| 2,466,091 | Feild | Apr. 5, 1949 |
| 2,693,414 | Dunn | Nov. 2, 1954 |